United States Patent
Lam

(10) Patent No.: US 9,541,055 B2
(45) Date of Patent: Jan. 10, 2017

(54) WATER PRESSURE POWER-GENERATING SYSTEM

(71) Applicant: Wai Hung Lam, Hong Kong (HK)

(72) Inventor: Wai Hung Lam, Hong Kong (HK)

(*) Notice: Subject to any disclaimer, the term of this patent is extended or adjusted under 35 U.S.C. 154(b) by 0 days.

(21) Appl. No.: 14/797,200

(22) Filed: Jul. 13, 2015

(65) Prior Publication Data

US 2016/0341174 A1    Nov. 24, 2016

(30) Foreign Application Priority Data

May 22, 2015  (CN) .......................... 2015 1 0266811

(51) Int. Cl.
   *F03B 13/10*   (2006.01)
   *F03G 7/04*    (2006.01)
   *H02K 7/18*    (2006.01)
   *F03B 17/00*   (2006.01)

(52) U.S. Cl.
   CPC ............. *F03B 13/10* (2013.01); *F03G 7/04* (2013.01); *H02K 7/1823* (2013.01); *F03B 17/005* (2013.01); *Y10S 415/916* (2013.01)

(58) Field of Classification Search
   CPC .......... F03B 13/10; H02K 7/1823; F03G 7/04; Y02E 10/20; Y02E 10/30
   USPC .................................................... 290/43, 54
   See application file for complete search history.

(56) References Cited

U.S. PATENT DOCUMENTS

| 2008/0264056 A1* | 10/2008 | Tung ....................... F03B 17/02 60/496 |
| 2009/0121486 A1* | 5/2009 | Ganley ................. F03B 13/262 290/53 |
| 2010/0089063 A1* | 4/2010 | McBride ............... F15B 11/032 60/682 |
| 2011/0316276 A1* | 12/2011 | Crowley .................. F03B 1/02 290/42 |
| 2012/0200091 A1* | 8/2012 | Pearson .................... F03B 1/00 290/1 R |
| 2014/0348641 A1* | 11/2014 | Wilson, Sr. ............. F03B 17/02 415/151 |
| 2016/0076511 A1* | 3/2016 | Constantz ............... F03B 13/10 210/652 |

* cited by examiner

*Primary Examiner* — Viet Nguyen

(57) ABSTRACT

A water pressure power-generating system includes a hydroelectric generator, a rotatable feeder, and at least two drain units all provided underwater. The drain units are disposed around the hydroelectric generator. Each drain unit includes a water catchment and a compression cylinder. The distance between the catchment and water surface is less than the distance between the compression cylinder and the water surface. The system further includes a gas compressor which can be connected with the compression cylinder through a pipeline. The rotatable feeder is provided with a first connection port for connection with the water outlet of the hydroelectric generator, and a second connection port for connection with the water inlet pipe of the water catchment. The first connection port is connected with the second connection port. When the system is provided in deep water, water pressure can be utilized to generate electricity.

10 Claims, 6 Drawing Sheets

WATER PRESSURE POWER-GENERATING SYSTEM

CROSS-REFERENCE TO RELATED APPLICATIONS

This present application claims the benefit of Chinese Patent Application No. 201510266811.0 filed on May 22, 2015, the contents of which are hereby incorporated by reference.

FIELD OF THE TECHNOLOGY

The present application relates to a power-generating system, and particularly to a water pressure power-generating system.

BACKGROUND

With the growing energy demand of the world and the increasing enhancement of environmental protection, promotion of the use of clean energy has become an inevitable trend. Nowadays, many clean power generation technologies, such as hydro power generation, wind power generation, solar power generation, have been developed and put into commercial applications. One direction of the development of clean water power generation, such as tidal power generation, ocean current power generation and wave power generation, has been developed for a long time, and has made certain achievement. However, water power generation has more limitation than power generation on land. Special conditions need to be met to generate more power. For example, tidal power generation requires the building of a dam in a bay area for interception, and the difference in tide levels needs to reach a certain height to store a certain amount of water for power generation. Wave power generation requires big wave as the driving force. It is necessary to have sustained wave to produce steady electricity. Ocean current power generation needs water currents to drive propeller blades to generate power and special water current conditions are required to generate electricity. Overall, although there are some experimental devices in operation for the above various power generations, they are not widely developed because they rely on a number of specific conditions in order to implement. In most countries and regions, it is not easy to find suitable locations for power generation, and this hinders the above-mentioned water power generation development and promotion.

SUMMARY

An object of the present invention is to provide a water pressure power-generating system and generate electricity using water pressure.

A water pressure power-generating system may include a hydroelectric generator, a rotatable feeder, and at least two drain units all provided underwater, the drain units being disposed around the hydroelectric generator.

The hydroelectric generator may include a water inlet and a water outlet. Each drain unit may include a water catchment and a compression cylinder. The distance between the catchment and water surface may be less than the distance between the compression cylinder and the water surface.

The water catchment may be provided with a first drainage outlet and a first drain valve at a bottom portion thereof. Each water catchment may be further provided with an air inlet having an air inlet valve and an air exhaust outlet having an exhaust valve. The air exhaust outlet may be disposed at a top portion of the water catchment. Each water catchment may be further provided with a water inlet pipe for connection with the rotatable feeder, the water inlet pipe being provided with a first water inlet valve.

The compression cylinder may include a housing and balloons provided inside the housing. The housing may be provided with a water inlet and a second water inlet valve. The balloons may be connected with the air exhaust outlet and the air inlet of each water catchment respectively through first and second pipelines.

The water pressure power-generating system may further include a gas compressor. The gas compressor may be connected with the compression cylinder through a third pipeline.

The rotatable feeder may be provided with a first connection port for connection with the water outlet of the hydroelectric generator, and a second connection port for connection with the water inlet pipe of the water catchment, the first connection port being connected with the second connection port.

In the water pressure power-generating system, when the water catchment is empty, a difference in pressure exists between the water inlet of the hydroelectric generator and the water catchment, and when the first water inlet valve is opened. The difference in pressure forces water from the water inlet of the hydroelectric generator into the hydroelectric generator to drive the hydroelectric generator to generate electricity. Water coming out from the water outlet of the hydroelectric generator enters the water catchment through the first and second connection ports and the water inlet pipe connected with the second connection port. Air inside the water catchment is forced from the air exhaust outlet into the balloons and the watch catchments in other drain units through the first pipeline.

In the water pressure power-generating system, the rotatable feeder may include a driving motor for driving the rotatable feeder to rotate. When water stops entering the water catchment connected with the second connection port, the driving motor drives the rotatable feeder to rotate so that rotatable feeder rotates to a next drain unit and connects with a water inlet pipe of a water catchment of the next drain unit.

In the water pressure power-generating system, when the water catchment drains out water, the first water inlet valve is closed, the air inlet valve is opened, and the second water inlet valve of the compression cylinder connected with the water catchment is opened. Water driven by pressure enters the compression cylinder through the water inlet of the compression cylinder and compresses the balloons, and presses the air inside the balloons into the water catchment through the second pipeline so as to drain out water in the water catchment through the first drain outlet.

In the water pressure power-generating system, the compression cylinder is connected with a drain pipe, and the drain pipe is provided with a second drain outlet and a second drain valve. When the compression cylinder drains out water, the second water inlet valve is closed, the gas compressor compresses gas into the compression cylinder, and water inside the compression cylinder drains out from the drain pipe.

In the water pressure power-generating system, the drain pipe extends upwards to a float provided on the water surface and extends above the water surface, an upper end of the drain pipe being provided with a third drain valve.

In the water pressure power-generating system, the gas compressor is further connected with the water catchment through a fourth pipeline.

The water pressure power-generating system includes a plurality of the drain units, and the plurality of drain units is evenly distributed around the hydroelectric generator.

The water pressure power-generating system further includes a platform, a wind power generator and/or a solar power generator provided on the platform.

In the water pressure power-generating system, a control room and a power plant for transmitting electricity are provided on the platform.

The water pressure power-generating system of the present application utilizes water pressure to generate electricity. Only when the water pressure power-generating system is provided in deep water, water pressure can be utilized to generate electricity. The water pressure power-generating system can be applied to water districts such as oceans, lakes and artificial lakes.

BRIEF DESCRIPTION OF THE DRAWINGS

Specific embodiments of the water pressure power-generating system will now be described by way of example with reference to the accompanying drawings wherein.

DETAILED DESCRIPTION

Figure 1:
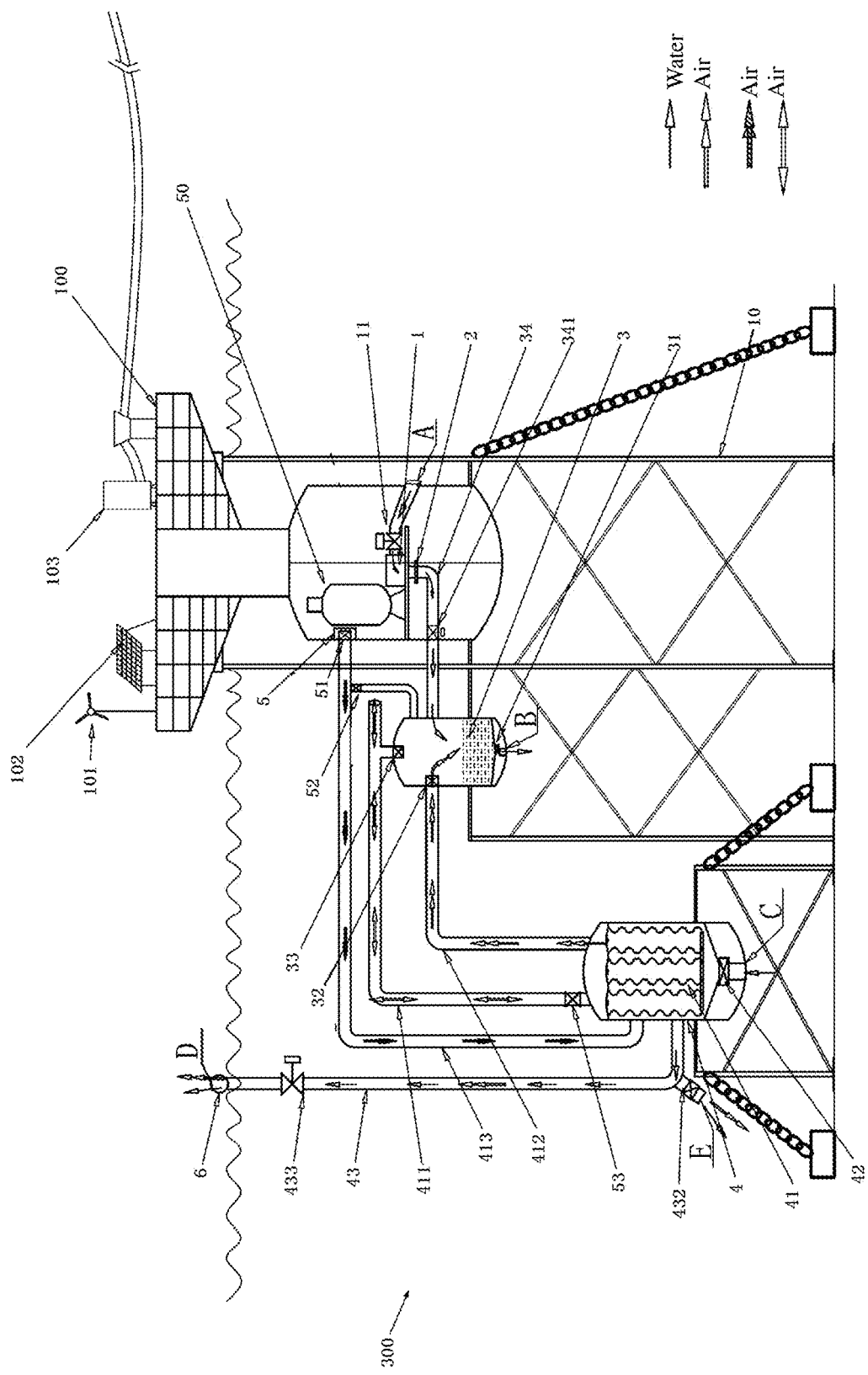
FIG. 1 is an illustrative diagram showing the structure of the water pressure power-generating system according to an embodiment of the present application.

Reference will now be made in detail to a preferred embodiment of the water pressure power-generating system, examples of which are also provided in the following description. Exemplary embodiments of the water pressure power-generating system are described in detail, although it will be apparent to those skilled in the relevant art that some features that are not particularly important to an understanding of the water pressure power-generating system may not be shown for the sake of clarity.

Furthermore, it should be understood that the water pressure power-generating system is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure and appended claims.

In addition, improvements and modifications which may become apparent to persons of ordinary skill in the art after reading this disclosure, the drawings, and the appended claims are deemed within the spirit and scope of the protection.

For illustration purposes, the terms "front", "back", "top", "bottom", "upper", "lower", "top portion", "bottom portion" appeared hereinafter relate to the invention as it is oriented in the drawings. It is understood that the invention may assume various positions, except where expressly specified to the contrary. Furthermore, it is understood that the specific devices shown in the drawings, and described in the following description, are simply exemplary embodiments of the invention. Hence, specific dimensions and other physical characteristics related to the embodiments disclosed hereinafter are not to be considered as limiting. Furthermore, the terms "first", "second" and so on are used for illustration purposes, and do not indicate or imply their importance.

FIG. 1 is an illustrative diagram showing the structure of the water pressure power-generating system according to an embodiment of the present application. The water pressure power-generating system may include a platform 100. The platform 100 can be fixed above water surface or sea surface by a bracket 10. The lower portion of the bracket 10 can be fixed at water bed or sea bed. The platform 100 can be in the form of a floating platform (raft) floating above water surface or sea surface, and being held at water bed or sea bed through an anchor chain. A wind power-generating device 101 and a solar power-generating device 102 may be provided on the platform 100, or only the wind power-generating device 101 or the solar power-generating device 102 may be provided on the platform 100. The wind power-generating device 101 and solar power-generating device 102 may adopt existing wind power generator and solar photovoltaic panels. The wind power-generating device 101 and solar power-generating device 102 can be used to provide a supply of supplementary power for the water pressure power-generating system, and maintain the operation of the water pressure power-generating system. The platform 100 may further be provided with a control room 103 and a power plant for transmitting electricity. In an embodiment, the control room 103 and the power plant are located together. That means the control room 103 is the power plant.

Referring to FIG. 1, the water pressure power-generating system may include a hydroelectric generator 1, a rotatable feeder 2, and at least two drain units 300. The hydroelectric generator 1, the rotatable feeder 2, and the at least two drain units 300 may all be disposed underwater and mounted on the bracket 10. The two or more drain units 300 may be disposed around the hydroelectric generator 1. The hydroelectric generator 1 can be used to generate electricity. It can be a regular turbo machine that can generate electricity when driven by water current. The hydroelectric generator 1 may include a water inlet A and a water outlet for the inflow and outflow of water. The water inlet A may be provided with a water valve 11. The water valve 11 can be controlled to open or close the water inlet A.

Each drain unit 300 may include a water catchment 3 and a compression cylinder 4. The water catchment 3 and the compression cylinder 4 can be connected together by a pipeline. The distance between the water catchment 3 and water surface may be less than the distance between the compression cylinder 4 and the water surface. The bottom portion of the water catchment 3 may be provided with a first drain outlet B and a first drain valve 31 for controlling the opening and closing of the first drain outlet B. The water catchment 3 may be further provided with an air inlet with an air inlet valve 32 for controlling the opening and closing of the air inlet, an air exhaust outlet with an exhaust valve 33 for controlling the opening and closing of the air exhaust outlet. The air exhaust outlet can be disposed at a top portion of the water catchment 3. The water catchment 3 may be further provided with a water inlet pipe 34 for connection with the rotatable feeder 2. The water inlet pipe 34 may be provided with a first water inlet valve (sluice) 341. The compression cylinder 4 may include a housing and balloons 41 provided inside the housing. The bottom portion of the housing may be provided with a water inlet C and a second water inlet valve 42 for controlling the opening and closing of the water inlet C. The balloons 41 can be connected with the air exhaust outlet 33 and the air inlet 32 of the water catchment 3 respectively through pipelines 411, 412. The compression cylinder 4 can be connected with a drain pipe 43. The drain pipe 43 may be provided with a second drain outlet E and a second drain valve 432 for controlling the opening and closing of the second drain outlet E. Furthermore, the drain pipe 43 may extend upwards to a float 6 provided on the water surface and may extend above the water surface. An upper end of the drain pipe 43 may be provided with a third drain valve 433. The water pressure power-generating system may further include a gas compressor 5. The gas compressor 5 may be connected with the compression cylinder 4 through a pipeline 413 for drainage of water of the compression cylinder 4.

Figure 2:
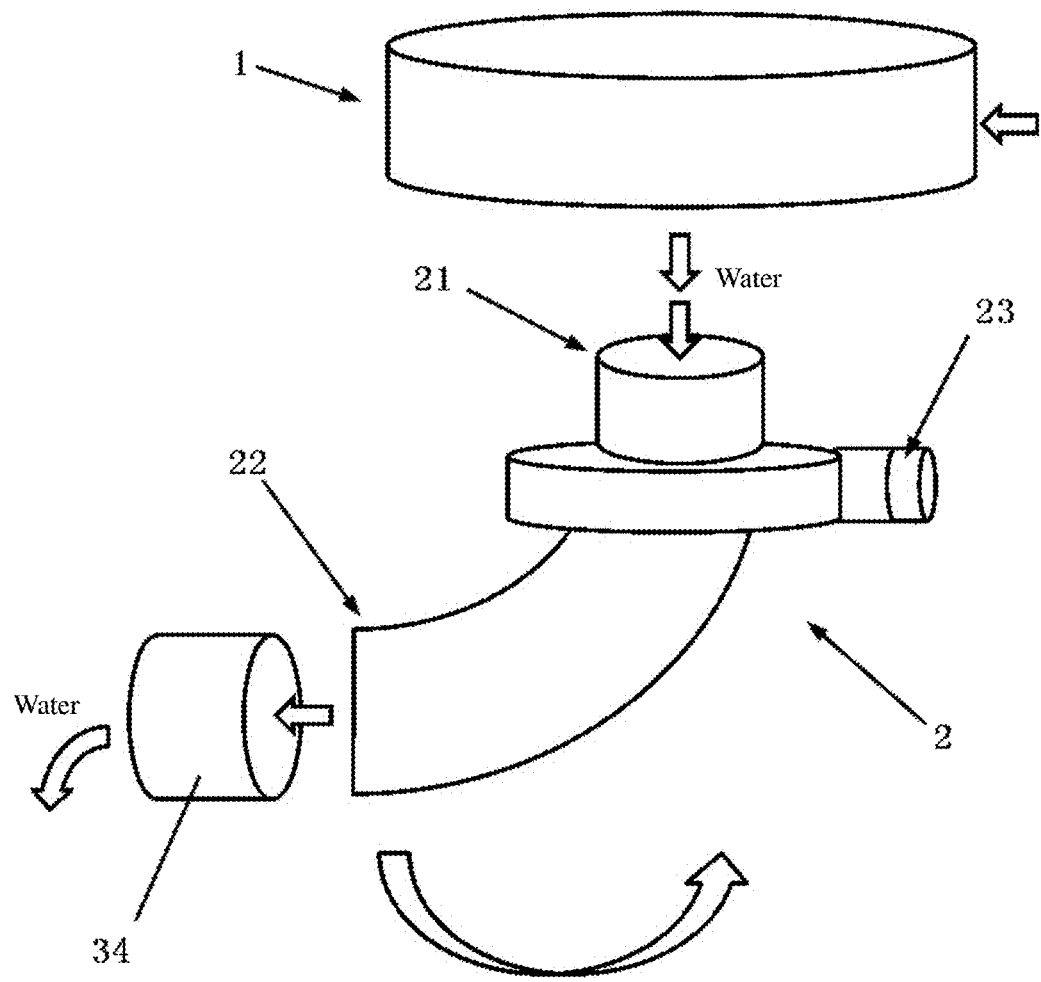
FIG. 2 is an illustrative diagram showing the principle of the rotatable feeder of the water pressure power-generating system.
Figure 3:
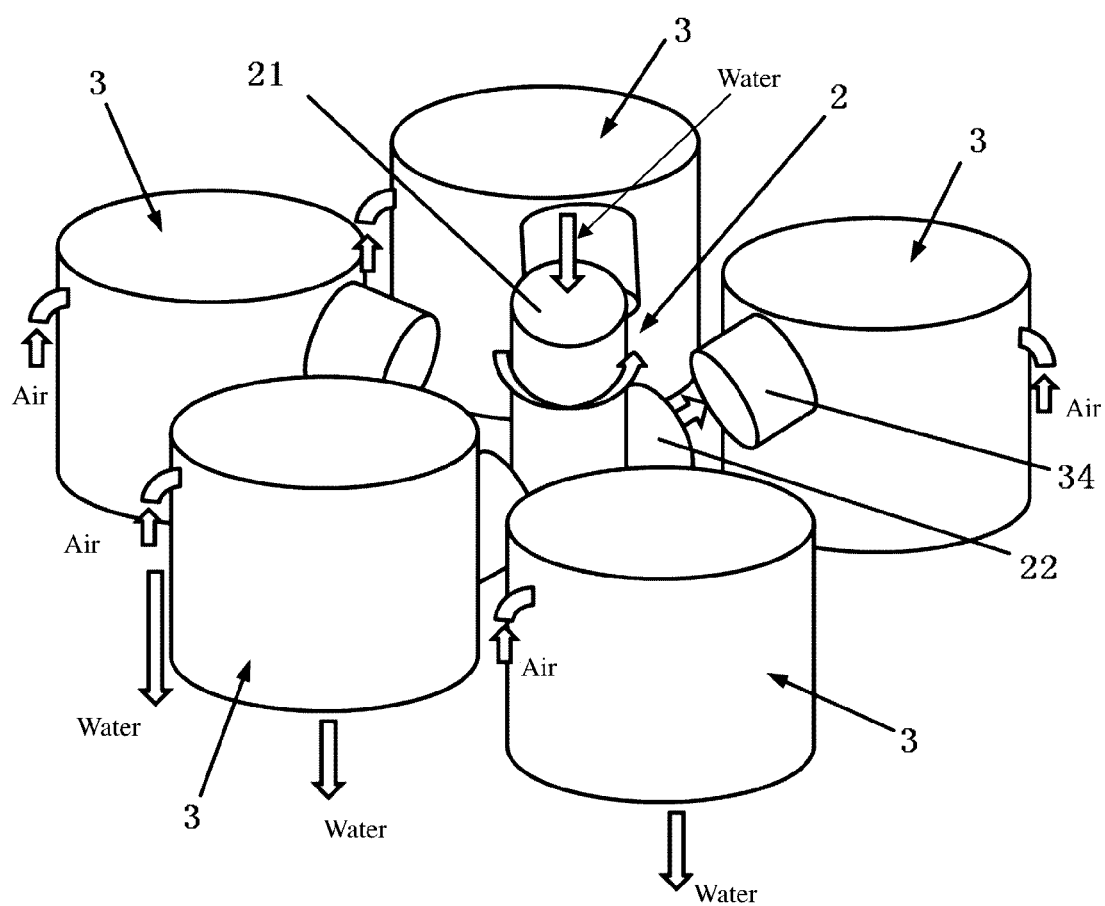
FIG. 3 is an illustrative diagram showing the cooperation of the rotatable feeder of the water pressure power-generating system with a plurality of water catchments.
Figure 4:
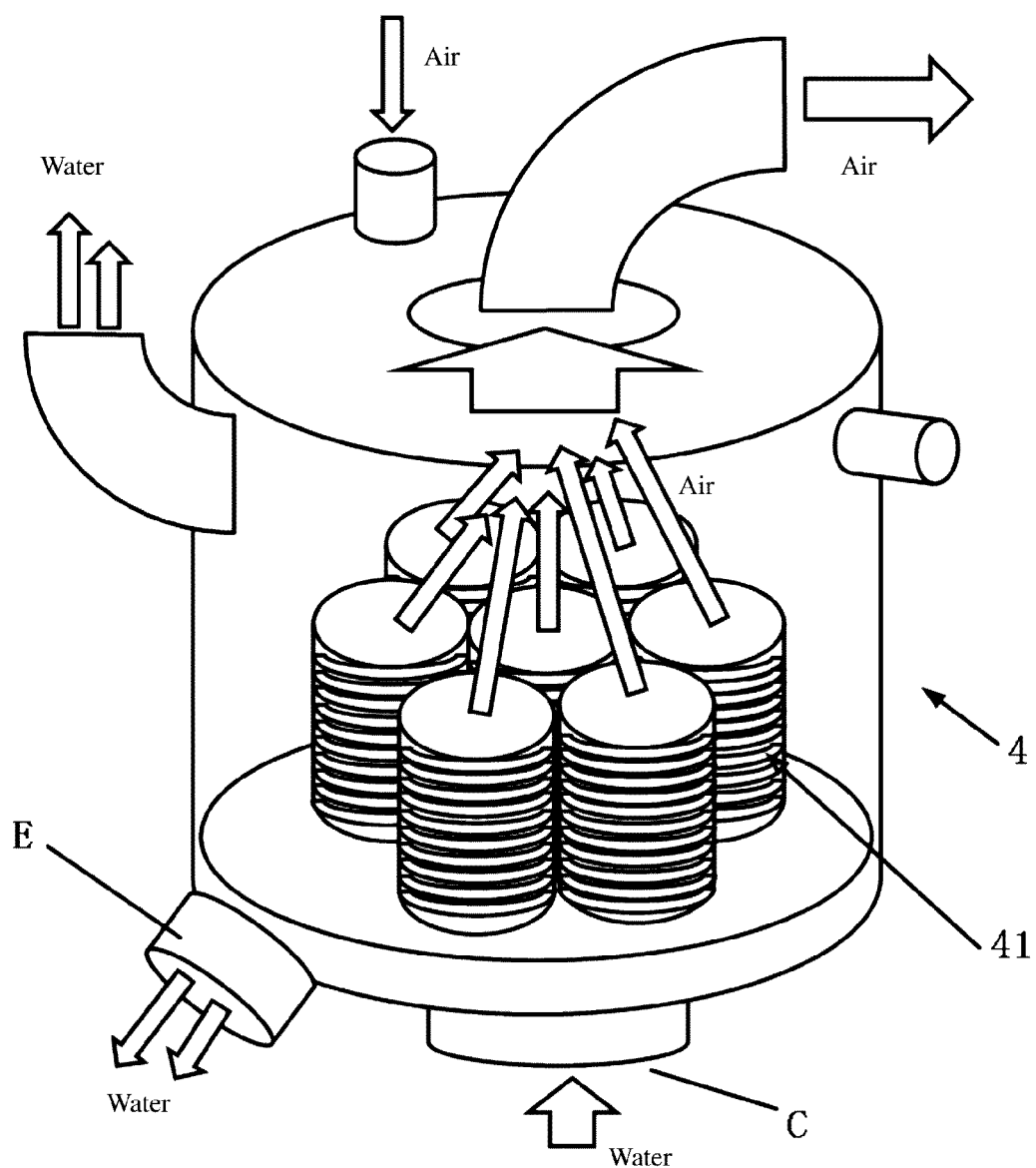
FIG. 4 is an illustrative diagram showing the principle of the compression cylinder of the water pressure power-generating system.
Figure 5:
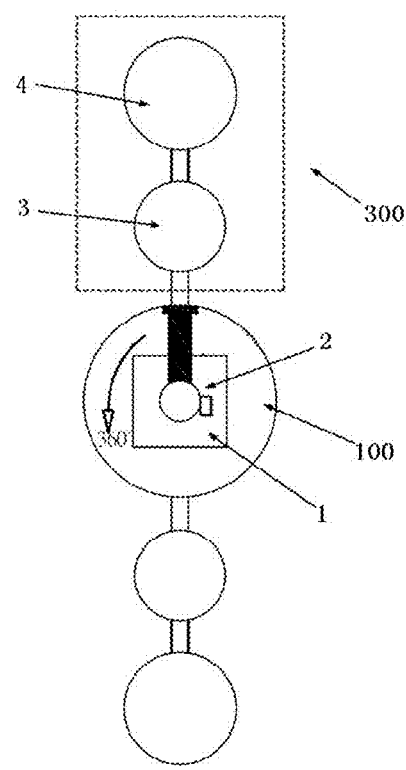
FIG. 5 is an illustrative diagram showing the water pressure power-generating system having two drain units.
Figure 6:
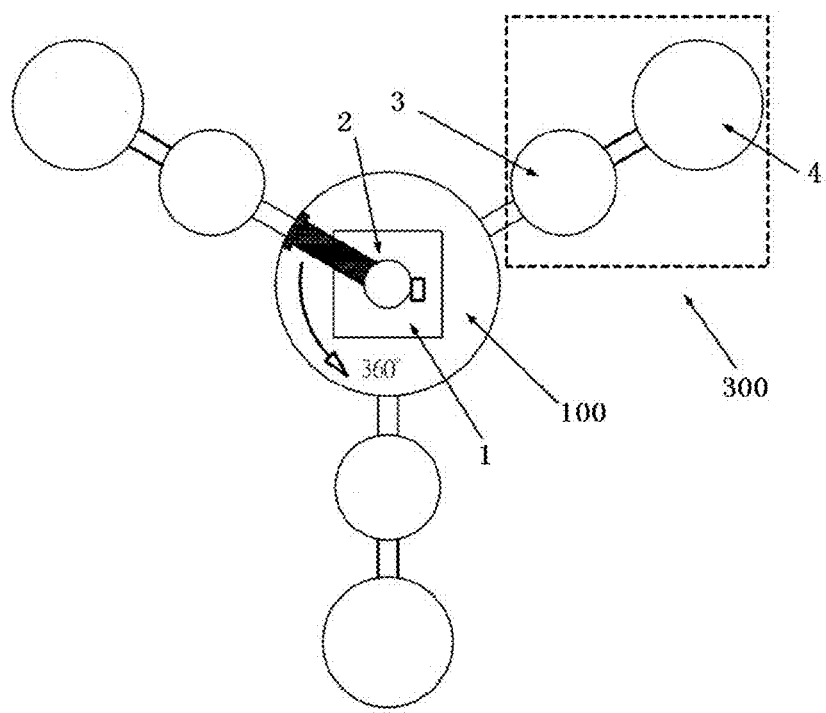
FIG. 6 is an illustrative diagram showing the water pressure power-generating system having three drain units.
Figure 7:
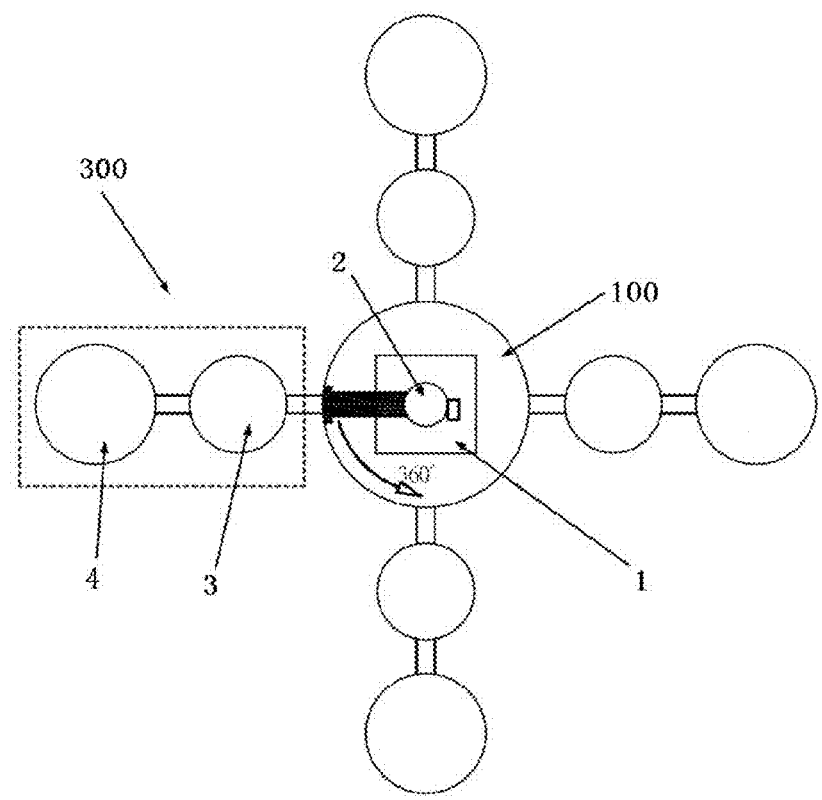
FIG. 7 is an illustrative diagram showing the water pressure power-generating system having four drain units.
Figure 8:
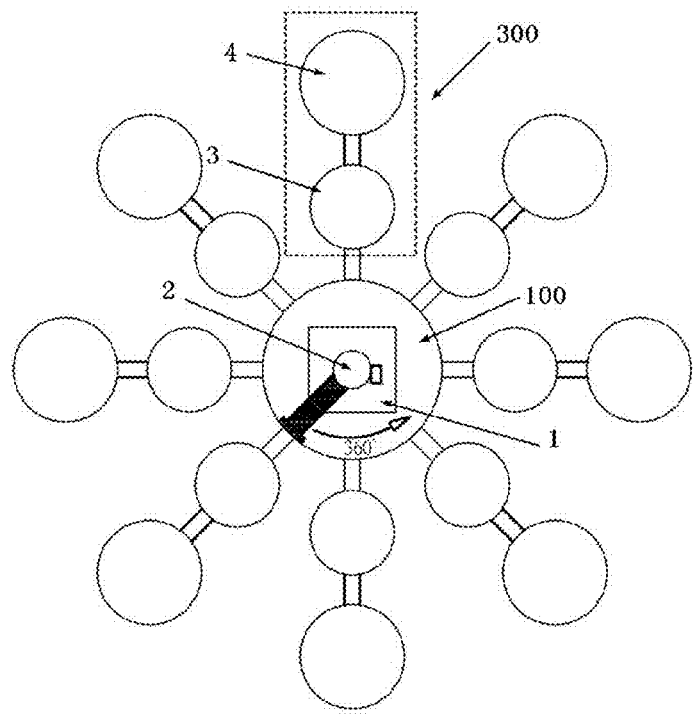
FIG. 8 is an illustrative diagram showing the water pressure power-generating system having eight drain units.

Referring to FIGS. 2 and 3, the rotatable feeder 2 may be provided with a first connection port 21 for connection with a water outlet of the hydroelectric generator 1, and a second connection port 22 for connection with the water inlet pipe 34 of the water catchment 3. The first connection port 21 can be connected with the second connection port 22. The rotatable feeder 2 may include a driving motor 23 for driving the rotatable feeder 2 to rotate so that the second connection port 22 can rotate to different drain units 300, and connect with the water inlet pipes 34 of the water catchments 3 of different drain units 300.

The structure of the water pressure power-generating system of the present application has been described above with reference to the drawings. The way the water pressure power-generating system of the present application generates electricity will be described below with reference to the drawings.

Referring to FIGS. 1-4, when the water catchment 3 is empty, i.e. when the water catchment 3 is at a fully drained state, a difference in pressure exists between the water inlet A of the hydroelectric generator 1 and the water catchment 3. The valve 11 at the water inlet A will be opened, and the first water inlet valve 341 at the water inlet pipe 34 will also be opened. The difference in pressure forces water from the water inlet A into the hydroelectric generator 1 to drive the hydroelectric generator 1 to generate electricity. Water coming out from the water outlet of the hydroelectric generator 1 enters the water catchment 3 through the first and second connection ports 21, 22 of the rotatable feeder 2, and the water inlet pipe 34 connected with the second connection port 22. Air inside the water catchment is forced into the balloons 41 through the air exhaust outlet pipeline 411, or enters the watch catchments in other drain units. At this time, the exhaust valve 33 of the water catchment 3 is in an open state. When water in the water catchment 3 reaches a certain level, the driving motor 23 drives the rotatable feeder 2 to rotate such that the second connection port 22 rotates to the next drain unit 300 and connects with the water inlet pipe 34 of the water catchment 3 of the next drain unit 300, and drains out water to the next water catchment 3. Hence, generation of electricity can be continued. Then, water stops entering the water catchment 3. At this time, the first water inlet valve 341 and the exhaust valve 33 are closed, and the water catchment 3 stops storing water.

The water catchment 3 filled with water enters a drainage process. When water catchment 3 drains out water, the first water inlet valve 341 and the exhaust valve 33 are closed. The air inlet valve 32 of the water catchment 3 is opened. The first exhaust valve 31 of the first drain outlet B is opened. The second water inlet valve 42 of the compression cylinder 4, which is connected with the water catchment 3, is also opened. Water driven by pressure enters the compression cylinder 4 through the water inlet C and compresses the balloons 41. The air inside the balloons 41 is forced into the water catchment 3 through pipeline 412 such that water inside the water catchment 3 is drained out through the first drain outlet B. When the water inside the water catchment 3 is drained out, the first drain valve 31 at the first drain outlet B is immediately closed, and the air inlet valve 32 and the second water inlet valve 42 of the compression cylinder 4 are closed. At this time, the water catchment 3 is at a fully drained state, waiting for the intake of water to be drained out from the hydroelectric generator 1 when the second connection port 22 of the rotatable feeder 2 rotates to that watch catchment 3 next time. After the drainage process of the water catchment 3 is completed, then the compression cylinder 4 enters a drainage process. The second water inlet valve 42 of the compression cylinder 4 is closed. The gas compressor 5 compresses air into the compression cylinder 4. Water inside the compression cylinder 4 drains out from the drain pipe 43. The second and third drain valves 432, 433 are opened. Water can drain out from the drain outlet E and the drain outlet D. When water inside the compression cylinder 4 drains out, the second and third drain valves 432, 433 are closed. Air valve 51 provided at the pipeline 413 connecting the gas compressor 5 and the compression cylinder 4 is closed.

To prevent failure of water drainage of the water catchment 3 in case of malfunction of the balloons 41, the gas compressor 5 can also be connected with the water catchment 3 through a pipeline. Also, the gas compressor 5 can be utilized to carry out air intake and water drainage of the water catchment 3. Air valve 52 can be provided at the pipeline connecting the gas compressor 5 and the water catchment 3. The compression cylinder 4 can also be connected to the water catchments 3 of other drain units 300 through pipeline 411. Air valve 53 may be provided at the pipeline 411 for filling the balloons 41 with air using air expels from the water catchment 3 when water is entering. The gas compressor 5 can also be provided with additional air storage can 50 for storing compressed air. The air storage can 50 can supply air when needed.

The water pressure power-generating system of the present application may include a plurality of drain units 300. The drain units 300 can be evenly distributed around the hydroelectric generator 1 so that the rotatable feeder 2 can connect with the water catchments 3 and the hydroelectric generators 1 of the drain units 300 one after another and generate electricity continuously. FIGS. 5 to 8 are illustrative diagrams of water pressure power-generating system with two drain units, three drain units, four drain units and eight drain units respectively.

The water pressure power-generating system of the present application utilizes water pressure to generate electricity. When the water pressure power-generating system is provided in deep water, water pressure can be utilized to generate electricity. The water pressure power-generating system can be applied to water districts such as oceans, lakes and artificial lakes. The water pressure power-generating system of the present application does not cause any pollution during power-generating process. Also, it does not cause any effect to the surrounding environment. The water pressure power-generating system of the present application is a totally clean and environmental power-generating system.

Certain embodiments of the system have been described above with reference to the drawings. However, it should be understood that the system is not limited to the embodiments described above. The above-mentioned embodiments are merely for illustration and are not limited to those embodiments. Various changes and modifications of the system may be effected by one skilled in the art without departing from the spirit or scope of the protection.

What is claimed is:

1. A water pressure power-generating system, comprising:
a hydroelectric generator, a rotatable feeder, and at least two drain units all provided underwater, the drain units being disposed around the hydroelectric generator;
the hydroelectric generator comprising a water inlet and a water outlet; each drain unit comprising a water catchment and a compression cylinder, the distance between the catchment and water surface being less than the distance between the compression cylinder and the water surface;
the water catchment being provided with a first drainage outlet and a first drain valve at a bottom portion thereof, each water catchment being further provided with an air inlet having an air inlet valve and an air exhaust outlet having an exhaust valve, the air exhaust outlet being disposed at a top portion of the water catchment, each water catchment being further provided with a water inlet pipe for connection with the rotatable feeder, the water inlet pipe being provided with a first water inlet valve;
the compression cylinder comprising a housing and balloons provided inside the housing, the housing being provided with a water inlet and a second water inlet valve, the balloons being connected with the air exhaust outlet and the air inlet of each water catchment respectively through first and second pipelines;
the water pressure power-generating system further comprising a gas compressor, the gas compressor being connected with the compression cylinder through a third pipeline; and
the rotatable feeder being provided with a first connection port for connection with the water outlet of the hydroelectric generator, and a second connection port for connection with the water inlet pipe of the water catchment, the first connection port being connected with the second connection port.

2. The water pressure power-generating system as claimed in claim 1, wherein when the water catchment is empty, a difference in pressure exists between the water inlet of the hydroelectric generator and the water catchment, and when the first water inlet valve is opened, the difference in pressure forces water from the water inlet of the hydroelectric generator into the hydroelectric generator to drive the hydroelectric generator to generate electricity, water coming out from the water outlet of the hydroelectric generator enters the water catchment through the first and second connection ports and the water inlet pipe connected with the second connection port, air inside the water catchment is forced from the air exhaust outlet into the balloons and the watch catchments in other drain units through the first pipeline.

3. The water pressure power-generating system as claimed in claim 2, wherein the rotatable feeder comprises a driving motor for driving the rotatable feeder to rotate, when water stops entering the water catchment connected with the second connection port, the driving motor drives the rotatable feeder to rotate so that rotatable feeder rotates to a next drain unit and connects with a water inlet pipe of a water catchment of the next drain unit.

4. The water pressure power-generating system as claimed in claim 2, wherein when the water catchment drains out water, the first water inlet valve is closed, the air inlet valve is opened, the second water inlet valve of the compression cylinder connected with the water catchment is opened, water driven by pressure enters the compression cylinder through the water inlet of the compression cylinder and compresses the balloons, and presses the air inside the balloons into the water catchment through the second pipeline so as to drain out water in the water catchment through the first drain outlet.

5. The water pressure power-generating system as claimed in claim 4, wherein the compression cylinder is connected with a drain pipe, the drain pipe being provided with a second drain outlet and a second drain valve, and when the compression cylinder drains out water, the second water inlet valve is closed, the gas compressor compresses gas into the compression cylinder, and water inside the compression cylinder drains out from the drain pipe.

6. The water pressure power-generating system as claimed in claim 5, wherein the drain pipe extends upwards to a float provided on the water surface and extends above the water surface, an upper end of the drain pipe being provided with a third drain valve.

7. The water pressure power-generating system as claimed in claim 1, wherein the gas compressor is further connected with the water catchment through a fourth pipeline.

8. The water pressure power-generating system as claimed in claim 1, wherein the water pressure power-generating system comprises a plurality of the drain units, the plurality of drain units is evenly distributed around the hydroelectric generator.

9. The water pressure power-generating system as claimed in claim 1, wherein the water pressure power-generating system further comprises a platform, a wind power generator and/or a solar power generator provided on the platform.

10. The water pressure power-generating system as claimed in claim 9, wherein a control room and a power plant for transmitting electricity are provided on the platform.

* * * * *